June 24, 1941. F. F. UEHLING 2,246,905
CONSTANT SPEED SERIES WOUND MOTOR
Filed April 22, 1940
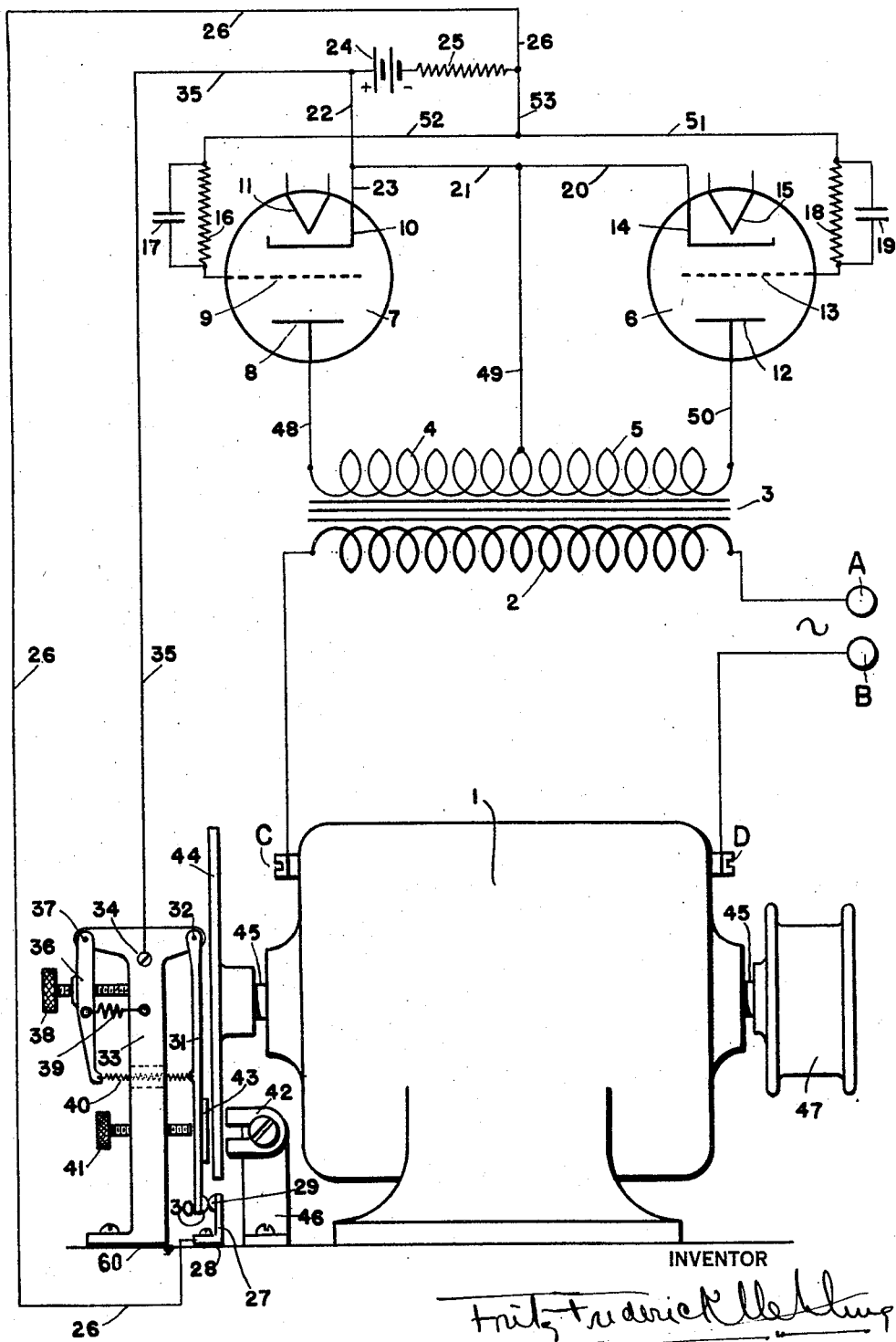
INVENTOR
Fritz Frederick Uehling Patented June 24, 1941

2,246,905

UNITED STATES PATENT OFFICE 2,246,905

CONSTANT SPEED SERIES WOUND MOTOR

Fritz Frederick Uehling, Passaic, N. J.

Application April 22, 1940, Serial No. 330,827

3 Claims. (Cl. 171—227)

My invention relates to improvements in constant speed series wound motors in which the electrical input is automatically increased or decreased as required to maintain a constant speed regardless of changes in either the load or the applied voltage. By a series wound motor, I mean a motor in which the field winding is connected in series with the armature winding. This type of motor has the decided advantage of high torque. On the other hand, for the great majority of motor applications, such a motor has also the serious disadvantage in that its speed decreases with the load. Similarly the speed of such a motor will increase as the load is decreased, even to the extent of running away or racing when the load is entirely removed. One of the objects of my invention is to provide means for controlling the electrical input to the motor as required to maintain a constant speed without recourse to any mechanical connection between the motor and the controlling means. This is accomplished in the manner to be described by means of eddy currents generated in a disc rotated by the motor in a plane which cuts magnetic lines of force. Another object is to regulate the power input to the motor by means of electronic tubes, the grid circuits of which are controlled by said eddy currents. Still another object is to afford facilities for adjusting said magnetic lines of force with respect to said eddy currents thereby making it possible to operate the motor at any desired constant speed regardless of changes in the load, or regardless of changes in the applied voltage.

The accompanying illustration is a diagrammatic view showing all of the essential elements of the invention some of which are in elevation.

In one form of the invention, a series wound motor 1 is connected in series with the primary winding 2 of a transformer 3 and receives its electrical energy from a source of alternating current consisting of terminals A and B. The transformer has two secondary windings 4 and 5, across each of which is connected a grid controlled rectifier as illustrated. In other words, one end of each of said secondary windings is connected with the cathodes 10 and 14 of electronic tubes 7 and 6 respectively, said secondary windings 4 and 5 being respectively connected with cathode 10 of tube 7 and cathode 14 of tube 6 through wires 49, 21 and 23, and through wires 49 and 20 as illustrated. The tubes 7 and 8 may be Thyratrons or any similar grid controlled tubes, tube 7 consisting of a plate 8, a grid 9, the cathode 10 and a heater 11, while tube 6 consists of a plate 12, a grid 13, the cathode 14 and a heater 15. The heaters 11 and 15 are maintained at the proper temperature by means of electrical energy from any source not shown.

It follows from the above that when the circuit through the motor and the primary winding 2 is closed, as illustrated, the current through the motor and said winding will be a function of the induced current in the secondary windings 4 and 5. The currents through the secondary windings 4 and 5 are however respectively controlled by the grids 9 and 13. These grids are respectively connected with the negative pole of a battery 24 through a resistance 16, wires 52 and 53 and a resistance 25, and through a resistance 18, wires 51 and 53, and the resistance 25, the positive pole of the battery being connected with the cathode 10 of tube 7 through wires 22 and 23 and with cathode 14 of tube 6 through wires 20, 21 and 22. The voltage of battery 24 is sufficiently high to prevent the firing of the tubes 6 and 7 thus preventing the flow of current through the secondary windings. The transformer is so designed that under these conditions the impedance of the primary coil 2 will be too high to permit sufficient current to flow through the motor to operate it. On the other hand if the battery is shortcircuited through the resistance 25, then the voltage on the grids 9 and 13 will drop to practically zero, both tubes will fire, induced halfwaves of one polarity will flow through tube 6, induced half-waves of the opposite polarity will flow through tube 7, and the motor will draw power at a rate depending primarily on its velocity and the current carrying capacity of the tubes. The battery 24 is normally shorted through resistance 25 by means of a switch consisting of contacts 29 and 30, said switch being controlled, in a manner to be presently described, by means of eddy currents induced in a disc 44 fastened to the shaft 45 of the motor and which is rotated by the motor through the flux of a permanent magnet 42. The contact 29 is fastened to a fixed bracket 27 which is insulated at 28, while the contact 30 is fastened to a movable arm 31 pivoted at 32 and supported by means of a stationary frame 33 which is insulated at 60. The permanent magnet 42 is fastened to a fixed bracket 46 and reacts with an armature 43 which armature is fastened to the pivoted arm 31. The magnet thus tends to close the switch by forcing the contact 30 towards the contact 29 against the tension of a spring 40 one end of which spring is fastened to the movable arm 31 and the other end to an adjustable member 36 as illustrated. The adjustable member 36 which is pivoted at 37 carries an adjusting screw 38 one end of which is held against the frame 33 by means of a spring 39. It thus follows that the fixed position of the adjustable member 36 and the corresponding tension of spring 40 may be adjusted as required by turning the screw 38 in one direction or the other.

The contact 29 is connected with the negative pole of battery 24 through bracket 27, wire 26 and the resistance 25, while the contact 30 is connected with the positive pole of said battery through the movable arm 31, bracket 33, connection 34 and wire 35. It thus follows that when the screw 38 is so adjusted that the reaction between the magnet 42 and the armature 43 is sufficiently great to overcome the tension of spring 40, contact will be established between 29 and 30, thus shortcircuiting the battery and permitting the tubes to fire. On the other hand if the force of reaction between the magnet and the armature is not sufficient to overcome the tension of the spring 40 then contact between 29 and 30 will be broken and the battery will apply the required voltage to the grids to prevent the firing of the tubes. In other words when the force of reaction between the magnet and the armature 43 dominates the force of the spring 40 then the battery 24 will be shortcircuited through the resistance 25 and, in the manner previously stated, the tubes 6 and 7 will fire thus providing power input to the motor which will operate to deliver power through a pulley 4 or through any other form of transmission, and simultaneously rotate the disc 44. This disc which is located in a plane between the magnet 42 and the armature 43 will obviously cut the magnetic lines of force which traverse the disc as a result of the reaction between the magnet and said armature thus causing eddy currents in the disc with a resulting counter electromagnetic force which tends to neutralize the effect of the magnet on the armature. The faster the disc rotates the greater will be the induced eddy currents, and the stronger will be the resulting counter electromagnetic force, said counter electromagnetic force increasing with the velocity of the disc until the reaction between the magnet 42 and the armature 43 has been sufficiently reduced to permit the domination of the spring 40, in which case the contact 30 will be separated from contact 29. However as soon as contact between 29 and 30 is broken, the battery will apply the required voltage to the grids to prevent the firing of the tubes thus terminating the power input to the motor, after which, the slightest reduction in the speed of the disc will sufficiently reduce the eddy currents to again permit sufficient domination by the magnet over the spring to again establish contact between 29 and 30. This cycle will obviously repeat itself as required to maintain the motor at a constant velocity. Furthermore the velocity of the motor will remain constant within very narrow limits regardless of changes in the load on the motor or changes in the applied voltage because the duration of each contact period between 29 and 30 and the frequency with which contact is established is solely a function of the speed of the disc.

It is obvious from the above that the constant velocity at which the motor will operate depends upon the relative force of reaction between the magnet 42 and the armature 43, and the force due to the tension of the spring 40. In other words the disc must reach a definite velocity for any given tension of the spring in order to induce eddy currents of the required magnitude to sufficiently influence the flux between the magnet and the armature to permit the spring to separate contact 30 from contact 29. It follows therefore that the constant speed of the motor may be increased by decreasing the tension of the spring 40, and decreased by increasing the tension of said spring. This is accomplished by turning the adjusting screw 38 in one direction or the other in the manner previously described.

An adjustable screw 41 carried by the frame 33 provides means for limiting the motion of the arm 31 which in turn limits the size of the air gap between the contacts 29 and 30 when contact is broken. Although this adjustment is not essential to the maintenance of a constant speed under normal conditions it nevertheless keeps the armature 43 in approximately a fixed position with respect to the magnet 42 which is desirable when the motor is maintained at a very low speed under no load conditions.

Due to the decided advantages of the high torque characteristics of a series wound motor, I have confined my description to that type of motor. It is obvious however that any motor may be maintained at any constant speed by the same method so long as the speed of the motor is some function of the load or some function of the power input. Furthermore although I have illustrated an alternating current motor it is obvious that a direct current motor may be operated by the same method if placed, for example, in the direct current line 49 in which case the primary coil 2 of the transformer would be directly connected with the alternating current source A—B.

I claim:

1. In a device of the class described, the combination with thermionic means for rectifying alternating current, of a source of alternating current for supplying energy to said means, a circuit for conducting the rectified current, a grid circuit for controlling the rectified current circuit, a switch for controlling the grid circuit which consists of a fixed contact and a movable contact arm, a rotatable disc, an armature located on one side of the disc and fastened to the movable arm, a magnet located on the opposite side of the disc, the flux of which reacts with the armature through the disc to actuate the switch in one direction when the disc is stationary, a spring which tends to actuate the switch in the opposite direction, and means controlled by the rectified current circuit for rotating the disc through the flux to create eddy currents therein which react with the flux to permit sufficient domination of the spring to actuate the switch in said opposite direction.

2. In a device of the class described, the combination with a fixed contact, of a second contact carried by a movable arm, an iron armature fastened to the movable arm, a magnet the lines of force of which react with the armature to engage the contacts, a rotatable disc located between the armature and the magnet in a plane which cuts the flux of the magnet, means for rotating the disc to create eddy currents which react with said flux to influence the reaction between the magnet and the armature, a spring which tends to disengage the two contacts, an electronic tube having a plate circuit which controls said rotating means, and a grid circuit for controlling the plate circuit, said grid circuit being controlled by the engagement and disengagement of said contacts.

3. In a device of the class described, the combination with a transformer having a primary circuit and two secondary circuits, of a thermionic tube in one of said secondary circuits for passing current of one polarity, a thermionic tube in the other of said secondary circuits for passing current of the opposite polarity, a grid circuit for each of said tubes for controlling said secondary circuits, means for applying a potential to said grid circuits, a switch for controlling said potential, a magnetically responsive armature for closing the switch, a magnet the lines of force of which react with the armature to close the switch, a disc located between the armature and the magnet in a plane which intersects said lines of force, a spring which tends to actuate the switch in the opposite direction against the force of reaction between the armature and the magnet, an electric motor in the primary circuit for rotating the disc to create eddy currents which react with said lines of force to permit the spring to open the switch, and independent means for adjusting the tension of the spring to change the speed of the motor.

FRITZ FREDERICK UEHLING.